United States Patent [19]
Rains

[11] 3,876,712
[45] Apr. 8, 1975

[54] STABILIZED HALOGENATED HYDROCARBONS

[75] Inventor: John H. Rains, Baton Rouge, La.

[73] Assignee: Ethyl Corporation, Richmond, Va.

[22] Filed: Aug. 10, 1972

[21] Appl. No.: 279,441

[52] U.S. Cl............................ 260/652.5 R; 212/407
[51] Int. Cl............................................. C07c 17/40
[58] Field of Search.................................. 260/652.5

[56] References Cited
UNITED STATES PATENTS

| | | | |
|---|---|---|---|
| 2,371,645 | 3/1945 | Aitchison et al......... | 260/652.5 R X |
| 2,973,392 | 2/1961 | Graham...................... | 260/652.5 R |
| 3,031,410 | 4/1962 | Petering et al........... | 260/652.5 R X |
| 3,265,747 | 8/1966 | Cormany et al. ............ | 260/652.5 R |
| 3,536,766 | 10/1970 | Mugford...................... | 260/652.5 R |
| 3,549,715 | 12/1970 | Cormany et al. ............ | 260/652.5 R |
| 3,564,061 | 2/1971 | Correia et al................ | 260/652.5 R |

FOREIGN PATENTS OR APPLICATIONS

| | | | |
|---|---|---|---|
| 1,443,641 | 2/1971 | Germany...................... | 260/652.5 R |

*Primary Examiner*—Howard T. Mars
*Attorney, Agent, or Firm*—Donald L. Johnson; Robert A. Linn

[57] ABSTRACT

Polybrominated hydrocarbons are stabilized by styrene oxides, For example, acetylene tetrabromide is stabilized with styrene oxide.

2 Claims, No Drawings

STABILIZED HALOGENATED HYDROCARBONS

BACKGROUND OF THE INVENTION

Various substances are known to stabilize halogenated materials; for example, see U.S. Pat. No. 3,479,414, column 1, lines 36–55 and U.S. Pat. No. 3,265,747. Alkylene oxides and epihalohydrin are known to stabilize acetylene tetrabromide; German Patent No. 1,443,641. U.S. Pat. No. 3,061,585 teaches stabilizing resins containing acetylene tetrabromide. U.S. Pat No. 2,797,250 teaches stabilization of chlorinated hydrocarbons with epoxide compounds. U.S. Pat. No. 2,973,392 teaches stabilization of chlorinated hydrocarbons with styrene oxide and alkylene oxides.

SUMMARY OF THE INVENTION

This invention pertains to stabilized compositions of the following type:

A brominated hydrocarbon having up to about 4 carbon atoms and at least two bromine atoms per carbon, said brominated hydrocarbon containing a small but effective amount of a stabilizer selected from compounds having the formula

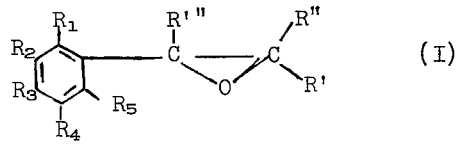

wherein $R_1$–$R_5$ and $R'$–$R'''$ are independently selected from hydrogen, and hydrocarbyl radicals selected from alkyl, cycloalkyl, alkenyl, aryl, aralkyl, and alkaryl radicals having up to about 12 carbon atoms such that the total number of carbon atoms in said compound does not exceed about 20.

A preferred embodiment is a stabilized acetylene tetrabromide composition in which the acetylene tetrabromide contains a small, but stabilizing amount of a stabilizer of Formula I having up to about 20 carbon atoms in which $R_1$–$R_5$ and $R'$–$R'''$ are all hydrogen or alkyl radicals of 1–6 carbons.

A more preferred embodiment comprises acetylene tetrabromide stabilized with styrene oxide.

DESCRIPTION OF PREFERRED EMBODIMENTS

This invention pertains to stabilization of brominated hydrocarbons which are susceptible to deterioration upon standing. Of these, the invention pertains especially to bromine compounds with at least two bromines bonded to each carbon atom. The brominated materials of main interest have more than one carbon atom per molecule.

Aliphatic materials are stabilized by this invention. Of these, alkyl compounds are preferred. Most preferred compounds are alkyl derivatives of up to about 4 carbon atoms.

Of these compounds, those containing at least two carbons are preferred. However, the stabilizers of this invention can be added to bromoform and carbon tetrabromide, if desired. Of the brominated materials, those solely composed of carbon, hydrogen and bromine are preferred. However, the perbrominated materials of two or more carbons such as $Br_3C$—$CBr_3$, $CBr_3$—$CBr_2$—$CBr_3$ and $Br_3C$—$CBr_2$—$CBr_2$—$CBr_3$ can be admixed with stabilizers of this invention, if desired. Of the hydrogen-containing materials, acetylene tetrabromide $CHBr_2$—$CHBr_2$, is highly preferred.

Generally, styrene oxide and any derivative thereof which stabilizes a halogenated species, as described above, can be used in this invention. The preferred additives are soluble in the amounts employed. More preferably, the additives should not react or otherwise decompose, whereby the stabilization is diminished to an undesirable extent during the period for which stabilization is desired.

Below are listed non-limiting examples of hydrocarbyl groups which may be present in the above general Formula I as groups $R'$–$R'''$ and $R_1$–$R_5$.

Examples of alkyl groups represented by the groups $R'$–$R'''$ and $R_1$–$R_5$ in the above general formula are methyl, ethyl, n-propyl, isopropyl, n-butyl, isobutyl, sec-butyl, tertbutyl, n-amyl, and the various positional isomers thereof, and likewise the corresponding straight and branched chain isomers of hexyl, heptyl, octyl, nonyl, decyl, undecyl, dodecyl, and the like.

When said groups $R_1$–$R_5$ and $R'$–$R'''$ are cycloalkyl groups, they may be cyclopropyl, cyclobutyl, cyclopentyl, cyclohexyl, cycloheptyl, cyclooctyl, cyclononyl, cyclodecyl, cycloundecyl, cyclododecyl, and the like. They may also be such cycloaliphatic groups as α-cyclopropyl-ethyl, α-cyclobutyl-propyl, and similar alkyl derivatives of the higher cycloalkyls.

The groups $R_1$–$R_5$ and $R'$–$R'''$ in the above general formula may also be alkenyl groups such as ethenyl, 1-propenyl, 2propenyl, isopropenyl, 1butenyl, 3butenyl, and the corresponding branched-chain isomers thereof as, for example, 1disobutenyl, 2-isobutenyl, 2sec-butenyl, including 1-methylene-2-propenyl, and the various isomers of pentenyl, hexenyl, heptenyl, octenyl, nonenyl, decenyl, undecenyl, and dodecenyl, including 3,3-dimethyl-1-butenyl, 2,3-dimethyl-2butenyl, 2,3-dimethyl-2dimethyl2-butenyl, 2,3-dimethyl-3-butenyl, 1-methyl-1-ethyl-2-propenyl, and the like.

When said groups $R_1$–$R_5$ and $R'$–$R'''$ are alkaryl groups, they may be 2,3-xylyl, 2,4-xylyl, 2,5-xylyl, 2,6xylyl, 3,4-xylyl, 3,5-xylyl; o, m, and p-cumenyl, mesityl, o, m, and p-ethylphenyl, 2-methyl-1-naphthyl, 3-methyl-1-naphthyl, 4-methyl-1-naphthyl, 5-methyl-2-naphthyl, 6-methyl-3-naphthyl, 7-methyl-1-naphthyl, 8-methyl-4-naphthyl, 1-ethyl-2-naphthyl, and its various positional isomers, and the like.

Examples of aryl groups which may be present in the above general formula are phenyl, naphthyl, and the like.

When the groups $R_1$–$R_5$ and $R'$–$R'''$ are aralkyl groups, they may be benzyl, phenylethyl, 1-phenylpropyl, 2-phenylpropyl, 3-phenylpropyl, 1 and 2 isomers of phenylisopropyl, 1, 2, and 3 isomers of phenylbutyl, and the like.

Such compounds suggest the use of stable, related compounds in which one or more of the groups $R_1$–$R_5$ and $R'$–$R'''$ contain a non-hydrocarbon substituent such as —Cl, —Br, —OH, —$NH_2$, and the like.

In general, the preferrred stabilizers of this invention have up to about 20 carbon atoms and the styrene oxide nucleus

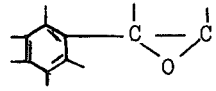

wherein the substituents appended are hydrogen, aliphatic radicals or benzenoid radicals. For purposes of this invention, benzenoid radicals are those having the benzene nucleus and are phenyl, naphthyl, substituted phenyl, and substituted naphthyl radicals. The substituted phenyl and naphthyl radicals include the alkaryl and aralkyl radicals. Of these stabilizers, those having hydrogen or aliphatic substituents are preferred. Of the aliphatic substituents, alkyl is preferred, especially those alkyl radicals of up to about 6 carbon atoms. In general, the most preferred stabilizers have no more than 2 alkyl radicals appended to the styrene oxide nucleus and these radicals have up to about 6 carbons. In other words, the most preferred stabilizers have at least six hydrogens appended to the styrene oxide nucleus and any remaining substituents (of $R_1$–$R_5$ and $R'$–$R'''$ of Formula I) are alkyl radicals of up to about 6 carbons.

Styrene oxide is a most preferred stabilizer. Although one stabilizer can be used, a mixture of stabilizers can be employed if desired. Thus 2, 3, or more styrene oxide stabilizers can be added to the halogenated hydrocarbon. A typical stabilizing mixture is styrene oxide and α-methyl styrene oxide.

The mixture can be heated to facilitate solution, if desired.

EXAMPLE 1

Illustrating the activity of this invention, tests were conducted on a

Blank - a non-stabilized acetylene tetrabromide specimen, and

Sample 1 - acetylene tetrabromide stabilized with 3000 ppm of styrene oxide.

After preparation and after storage at 110°F. for various intervals, the pH, APHA color and bromide content ($BR^-$ as NaBr) were measured.

For pH, a 15 ml sample is shaken with 45 ml of neutral deionized water. After the phases have separated for at least 5 minutes, the pH of the aqueous phase is measured.

For bromide, the aqueous phase after measuring the pH is transferred to a 50 ml volumetric flask and diluted to the mark with $H_2O$. A 20 ml aliquot is mixed with 40 ml of isopropanol, and 5 ml of 50 percent nitric acid solution. The mixture is titrated with 0.01N Ag $NO_3$ solution. Blanks are also titrated.

The results were as follows:

$Br^-$ as NaBr

|  | Initial | DAYS | | | | | | |
|---|---|---|---|---|---|---|---|---|
|  |  | 5 | 7 | 11 | 14 | 18 | 24 | 32 |
| Blank (air)* | 42.9 | 43.4 | — | 28.9 | 45.2 | 28.6 | 60.5 | 43.6 |
| Blank (nitrogen)* | — | 22.5 | 34.3 | 20.0 | 21.7 | 18.5 | 14.3 | 11.8 |
| Sample No. 1 | 7.3 | 6.6 | 14.2 | 7.8 | 3.3 | 4.7 | 5.4 | 3.7 |

APHA Color

|  | Initial | DAYS | | | | | | |
|---|---|---|---|---|---|---|---|---|
|  |  | 3 | 7 | 11 | 14 | 18 | 24 | 32 |
| Blank (air) | 9 | 14 | 22 | 22 | 40 | 38** | 132** | 48** |
| Blank (nitrogen) | — | 14 | 14 | 14 | 14 | 14 | 17 | 32 |
| Sample No. 1 | 48 | 45 | 19 | 11 | 16 | 10 | 33 | 32 | pH

|  | Initial | DAYS | | | | | | |
|---|---|---|---|---|---|---|---|---|
|  |  | 3 | 7 | 11 | 14 | 18 | 24 | 32 |
| Blank (air) | 3.2 | 3.7 | 3.2 | 3.2 | 2.7 | 3.0 | 2.9 | 2.9 |
| Blank (nitrogen) | — | 3.5 | 4.2 | 3.6 | 3.2 | 3.4 | 3.6 | 3.7 |
| Sample No. 1 | 4.6 | 4.3 | 4.6 | 4.6 | 4.9 | 4.6 | 4.3 | 4.5 |

*Blank maintained under air and nitrogen, respectively.
**Polyethylene bottle cap turned black, sample clouded, and had to be filtered A stabilizing amount of stabilizer is employed. The amount used can be varied and is dependent, at least to some extent, on the nature of the halogenated material being stabilized and the activity of the stabilizer. By tests, such as described below, stabilization achieved by various additive concentrations can be observed. With the data obtained, a skilled practioner can select the desired concentration. In general, the amount of stabilizer is less than 10 weight percent, usually less than 1 percent and preferably from 10 to 10,000 ppm by weight. A more preferred concentration range is from about 50 to about 8000 ppm; most preferably from about 500 to about 5000 ppm by weight.

The stabilizer additive and halogenated material to be stabilized can be admixed in any known manner.

Similar results are obtained when the styrene oxide is replaced with α-methyl styrene oxide, α-n-butyl styrene oxide, αβ-dimethylstyrene oxide, β-n-butyl styrene oxide, β,β-di-n-butylstyrene oxide, β-methylstyrene oxide, α,β,β-triethylstyrene oxide, p-n-hexylstyrene oxide, 3,5-di-n-hexylstyrene oxide, 1,2,3,4,5-pentamethylstyrene oxide, 4-phenylstyrene oxide, p-(3,4-xylyl)styrene oxide, p-cyclohexylstyrene oxide, 2-phenylethylstyrene oxide and 3,5-di-n-butylstyrene oxide.

Similar results are obtained when a mixture of styrene oxide and α-methylstyrene oxide is used. Similar results are obtained when the above compounds are used in amounts of from about 500 to about 8000 ppm by weight.

Similar results are obtained when the above styrene oxides, in the above amounts, are used, and the acetylene tetrabromide is substituted with, one at a time, $CBr_4$, $CHBr_3$, $CH_2Br_2$, $Br_3C—CBr_3$, $Br_3C—CBr_2—CBr_3$, $CHBr_2—CBr_2—CHBr_2$, $HBr_2C—CBr_2—CBr_2—CHBr_2$, and $CBr_3—CBr_2—CBr_2—CBr_3$.

Similarly, the above styrene oxides can be used to form mixtures which stabilize acetylene tetrabromide and analogous halogenated hydrocarbons. In other words, one or more of the above styrene oxides can be mixed with stabilizers of different types. In such mixtures, the relative amounts of stabilizers is not critical. Thus, the relative amounts are selected by such considerations as economics, degree of stabilization desired, compatibility of the admixed stabilizers with themselves and the substrate to be stabilized, and the like. In general, good results are obtained if the total concentration of stabilizer is from about 1000 to about 6000 ppm by weight, and the proportion of the above styrene oxides in the stabilizing mixture is at least about 50 percent, i.e. more than half of the added stabilizing composition is a styrene oxide.

With such considerations in mind, mixtures of the above styrene oxides can be formulated with, for example A. Glycidyl ethers having the formula

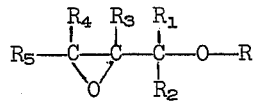

where $R_1-R_5$ are hydrogen or the hydrocarbyl radicals of the type discussed above having up to about 12 carbons such that the total number of carbons does not exceed about 15;

B. Epibromohydrin, epichlorohydrin and alkylene oxides such as those within German Patent No. 1,443,641. Of these alkylene oxides, propylene oxide is typical;

C. Compounds of the formula

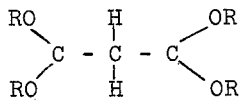

where the various R's are hydrocarbyl groups of up to about 14 carbons of the type discussed above;

D. Orthoesters selected from compounds having the formula

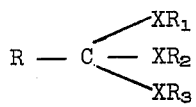

wherein X is oxygen or sulfur, R is hydrogen or an alkyl radical of up to about 4 carbon atoms, and $R_1$, $R_2$ and $R_3$ are hydrocarbyl groups selected from the class consisting of alkyl, cycloalkyl, alkenyl, aryl, and aralkyl groups having up to about 9 carbon atoms, and E. Acetylenic alcohols, such as methyl pentynol, of the formula

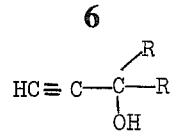

wherein R is as in Formula (1) above.

EXAMPLE 2

Following the procedure of Example 1, the stability at 110°F. was compared between an unstabilized acetylene tetrabromide specimen and Sample A, i.e. acetylene tetrabromide containing 1500 ppm styrene oxide and 1500 ppm triethyl orthoformate. The results obtained were as follows:

| Time | ppm NaBr | | pH | | Color | |
| --- | --- | --- | --- | --- | --- | --- |
| | Blank | Sample A | Blank | A | Blank | A |
| Initial | 10.3 | 7.4 | 3.5 | 3.9 | 42 | 57 |
| 4 Day | 11.8 | 7.9 | 3.2 | 4.0 | 80 | 22 |
| 11 Day | 17.7 | 7.1 | 3.4 | 4.4 | 112 | 25 |
| 21 Day | 10.0 | 10.0 | 3.5 | 4.9 | — | 14 |

EXAMPLE 3

A blank run was made by heating 75 ml of acetylene tetrabromide at 75°C. for 2 hours. The material was cooled to room temperature and a 15 ml aliquot was taken. This was shaken with 45 ml of water for 1 minute. The aqueous phase was collected and diluted to 50 ml. It was analyzed for $Br^-$ as sodium bromide. The remaining organic phase was checked for APHA color. In addition to the blank, Sample A was tested and worked up in the same way. Sample A was acetylene tetrabromide and 3000 ppm styrene oxide. In addition, Sample B was tested and worked up in the same way; it was acetylene tetrabromide with 1500 ppm of styrene oxide and 1500 ppm of triethyl orthoformate. The results are given below. For the blank, values are given before and after heating. For Samples A and B, the values are those obtained after subjecting the samples to the heating treatment.

| | NaBr ppm | APHA Color |
| --- | --- | --- |
| Blank — before heating | 8.1 | 86 |
| Blank — after heating | 47 | 197 |
| Sample A | 9.1 | 89 |
| Sample B | 8.0 | 132 |

I claim:

1. A stabilized composition consisting essentially of acetylene tetrabromide and from about 500 to about 5000 parts per million by weight of a compound having the formula

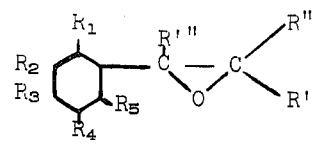

said compound having up to about 20 carbon atoms and wherein $R_1-R_5$ and $R'-R'''$ are selected from the class consisting of hydrogen and alkyl radicals of 1–6 carbon atoms.

2. A composition of claim 1 wherein said compound is styrene oxide.

* * * * *